United States Patent Office 3,532,708
Patented Oct. 6, 1970

3,532,708
CROSSLINKABLE PRESSURE-SENSITIVE ADHESIVE RESINS
Robert B. Blance, East Longmeadow, Mass., assignor to Monsanto Company, St. Louis, Mo., a corporation of Delaware
No Drawing. Filed Nov. 2, 1967, Ser. No. 679,997
Int. Cl. C08f 27/04, 45/72
U.S. Cl. 260—31.2        17 Claims

ABSTRACT OF THE DISCLOSURE

Disclosed herein are polymer compositions which are capable of rapid room temperature cure to provide permanently tacky creep-resistant pressure-sensitive adhesives. These crosslinkable compositions comprise: (1) an interpolymer wherein one of the monomeric reactants used to prepare the interpolymer is a hydroxy-bearing acrylate, methacrylate, maleate or fumarate monomer; and (2) at least one metal alkoxide.

BACKGROUND OF THE INVENTION

Field of the invention

The present invention is directed to polymer compositions which are capable of rapid cure at room temperature to provide permanently tacky, creep-resistant pressure-sensitive adhesives. These crosslinkable compositions comprise: (1) an interpolymer wherein one of the monomeric reactants used to prepare the interpolymer is a hydroxy-bearing acrylate monomer and (2) at least one metal alkoxide.

Description of the prior art

Pressure-sensitive resins are usually applied to substrates from solution. They may then be cured using such means as organic peroxides, radiation treatment, heat treatment and chemical means which involve the reaction of functional groups in the resins with reactive additives such as epoxides, phenol formaldehydes, methylol ureas, etc. These curing reactions are used to obtain improved creep-resistance and holding power of pressure-sensitive resins. However, they suffer variously from several disadvantages which are discussed below.

Pressure-sensitive resin systems based on interpolymers prepared using at least one hydroxy-bearing acrylate monomeric component are taught by Jubilee et al. in U.S.P. 3,222,419 and Horn et al. in 3,269,994. Jasinski in U.S.P. 3,208,963 describes the preparation of resins of vinyl acetate, crotonic acid and a hydroxyalkyl acrylate. He teaches curing these polymers with dialdehydes, methylol ureas, and phenol formaldehydes using acidic catalysts including acid salts as optional accelerators of the reaction. Jubilee et al. use methylol melamine as a curing agent, catalyzed with para-toluenesulfonic acid. Horn et al. do not use a catalyst but rather rely on the use of elevated temperatures. The disadvantages of present methods of curing pressure-sensitive resins based on acrylate polymers and copolymers containing hydroxy groups are discussed below.

Peroxide curing of resins requires a peroxide which produces reactive oxy-radicals upon cleavage during heating. Peroxide curing, while generally an excellent and effective means of curing hydroxy-containing pressure-sensitive adhesives is limited to those substrates, polymers and application conditions that can tolerate the heat/time cure cycles necessary for peroxide cure.

Radiation cure has certain drawbacks in that it requires expensive equipment which is not generally available. In addition, a non-uniform cure is generally achieved occurring to a greater extent at the exposed surface and to a lesser extent below the surface.

Heat treatment curing of pressure-sensitive resins is limited to those substrates, polymers and application conditions that can tolerate the heat/time cure cycles necessary for cure.

Reactive additives which are usually added to crosslink hydroxy functional groups in pressure sensitive resins (e.g. aldehydes, methylol ureas and phenol formaldehyde condensates with acid catalysts) generally produce blends which have a short pot-life and are inconvenient to use on commercial equipment. Moreover, it is usually difficult to obtain and maintain the desired level of pressure-sensitive properties after cure. Furthermore, the formulation resins are prone to aging with ultimate loss of pressure-sensitivity.

SUMMARY OF THE INVENTION

The compositions of the present invention solve long standing problems in the pressure-sensitive adhesive art by providing stable solutions of pressure-sensitive resins with good shelf-life which can be applied to a substrate and cured uniformly and rapidly at room temperature to provide permanently tacky, creep-resistant pressure-sensitive adhesives.

The compositions of the present invention comprise: (1) an interpolymer wherein one of the monomeric components used to prepare the interpolymer is a hydroxy-bearing acrylate, methacrylate, maleate or fumarate monomer and (2) at least one metal alkoxide wherein the metal alkoxide is of the following general formula:

$$R_m M(OR')_n$$

wherein M is a metal selected from the group consisting of Groups II, III, IV and V of the Periodic Table; R is selected from the group consisting of alkyl radicals of from 1 to 8 carbon atoms and aryl radicals of from 6 to 16 carbon atoms. R' is selected from the group consisting of aliphatic and substituted aliphatic radicals containing from 1 to 18 carbon atoms; $m$ is an integer whose value is zero or greater and $n$ is an integer of at least 2, wherein the sum of $m+n$ is greater than one (1) and is equal to the valence of the metal represented by M.

An object of this invention is to provide improved pressure-sensitive adhesive compositions capable of rapid cure at room temperature.

A further object is to provide a method for the room temperature cure of pressure-sensitive adhesives.

A further object of this invention is to provide tapes, sheets and other substrates coated with a polymer system comprising: (1) a hydroxy-containing interpolymer and (2) a metal alkoxide which polymer system may be crosslinked to give a high degree of cohesive strength and yet retain tack and adhesion, even upon aging.

These and other objects are obtained through the provision of an organic liquid system comprising a metal alkoxide compound and an interpolymer prepared from a mixture comprising from 20 to 80 weight percent of (A), from 10 to 55 weight percent of (B) and from 1 to 20 weight percent of (C), wherein (A), (B) and (C) total 100 weight percent; wherein (A) is an ester of acrylic or methacrylic acid containing from 7 to 20 carbon atoms, (B) is a monomer selected from the group consisting of vinyl esters of alkanoic acids containing from 3 to 10 carbon atoms, ethyl and methyl esters of acrylic and methacrylic acids, acrylonitrile, styrene and vinyl chloride; (C) is a hydroxy-containing monomer selected from the group consisting of hydroxyalkyl acrylates, hydroxyalkyl methacrylates, hydroxyalkyl fumarates and hydroxyalkyl maleates, wherein the alkyl group contains from 2 to 4 carbon atoms; and wherein the metal alkoxide is present in an amount of at least 0.01 equivalent of metal alkoxide per equivalent of active hydrogen in the interpolymer. The metal alkoxides used in the present invention correspond to the following general formula:

$$R_mM(OR')_n$$

as described above.

DESCRIPTION OF THE PREFERRED EMBODIMENTS

The present invention involves the preparation of a special interpolymer which is subsequently formulated with a metal alkoxide and cured to a creep-resistant, permanently tacky composition. The special interpolymer is prepared from at least one monomer from each of three special groups, designated A, B, and C for the sake of this application. The above-mentioned monomers of Group (A) are of the type which give internal plasticization to the copolymer, i.e., they contribute to a large free-volume in the copolymer and by enhancing segmental mobility, increase the wetting ability of the final polymeric product. Hence, tack and adhesion of the polymeric composition are attributable to this group of monomers. However, to provide the necessary balance between tacky adhesion and cohesive strength, monomers selected from groups (B) and (C) are also required. Monomers of Group (B) by themselves contribute substantially to cohesive strength by stiffening the molecular chains, but by far the larger contribution to cohesive strength is obtained from monomers of Group (C) which consists of monohydroxyalkyl acrylate and methacrylate monomers and mono- and di-hydroxyalkyl fumarate and mono- and di-hydroxyalkyl maleate monomers.

After the polymerization step, the organic liquid polymer system is formulated with a critical amount of a solution of a metal alkoxide.

The special interpolymers of this invention are conveniently prepared by organic solvent polymerization techniques involving in some cases delayed addition of monomer when there is a great disparity between reactivity ratios as for example between the reactivity ratios of vinyl acetate and acrylate monomers. The time interval for the delayed addition may range from about 60 to about 600 minutes and longer. The techniques in general, involve the polymerization of the respective monomer mixtures in suitable organic solvents, the polymerization being initiated by heat activated free radical initiators.

The choice of solvents for the interploymer used in the practice of this invention is governed by the solubility requirements of the monomers and the resulting interpolymers in that both the monomers and the resulting interpolymers should be soluble in the selected solvent or mixtures of solvents. A further requirement is that the interpolymer solution should contain less than 3% water by weight, based on the total weight of the solvent, in order to avoid adverse interference with the metal alkoxide component. More preferably, the interpolymer solution should contain less than 2% water by weight.

Examples of suitable solvents for the interpolymers include aromatic solvents such as benzene, toluene, xylene, etc. Suitable aliphatic solvents include esters such as ethyl acetate, propyl acetate, isopropyl acetate, butyl acetate, etc.; ketones such as methyl ethyl ketone, acetone, etc.; aliphatic hydrocarbons such as hexane, pentane, etc. Especially useful are mixtures of the foregoing.

The polymer systems of this invention may also be prepared in mass or non-aqueous dispersion type polymerization processes as are well known to those skilled in the art. However, solution polymerization processes are preferred.

Polymerization initiators suitable for the preparation of the special interploymers of this invention include organic peroxides, such as tert-butyl hydroperoxide, di-tert-butylperoxide, cumene hydroperoxide, di-cumyl peroxide, benzoyl peroxide and the like. Equally suitable are organic peroxygen compounds such as tert-butyl peroxide acetate, tert-butyl perbenzoate, di-tert-butyl diperphthalate; other initiators would include $\delta,\delta'$-azo-diisobutyronitrile, ultraviolet light, gamma radiation, etc.

The following Examples 1 to 13 illustrate the preparation formulation and testing of the special interpolymers which are to be used in the practice of this invention and are not to be construed as limitations thereof. All parts and percentages are by weight unless otherwise specified and the expressions polymer and interpolymer are used interchangeably.

PREPARATION OF THE INTERPOLYMERS

Example 1

This example illustrates the preparation of a polymer solution prepared from 42.5 parts vinyl acetate, 47.5 parts 2-ethylhexyl acrylate and 10.0 parts of hydroxyethyl acrylate.

The polymer is prepared under reflux conditions in a two-liter reaction flask equipped with a stirrer, condenser, thermometer and metering pump for the delayed addition of monomers. The ingredients are charged to the flask as follows:

AMOUNT OF INGREDIENTS IN GRAMS

|  | Initial charge | Delay 1 | Delay 2 | Delay 3 |
|---|---|---|---|---|
| Vinyl acetate | 170 | | | |
| 2-ethylhexyl acrylate | 13 | 177 | | |
| 2-hydroxyethyl methacrylate | 2 | 38 | | |
| Ethyl acetate | 50 | 110 | | |
| Toluene | | 15 | 115 | |
| Benzoyl peroxide | 2.0 | | | |
| Hexane | | | | 250 |
| 2B ethanol | | | | 60 |

The delays are added according to the schedule:

| Time interval from initial reflux, minutes | Delay 1 (ml.) | Delay 2 (ml.) | Delay 3 (ml.) |
|---|---|---|---|
| 0–60 | 190 | | |
| 60–90 | 50 | | |
| 90–120 | 50 | 16 | |
| 120–180 | 55 | 37 | |
| 180–240 | 30 | 37 | |
| 240–300 | | 37 | |
| 390 | | | 456 |

After a total reflux time of 6.5 hours, a viscous resin solution is obtained. The solids content is 39.7 percent; the Brookfield viscosity is 2,300 cps.

Examples 2 to 13

The general polymerization procedure of Example 1 is followed here except that different monomers and monomer ratios are used in order to illustrate the wide variation in the choice of an interpolymer system that is possible in the practice of this invention. The composition of these interpolymers and their solution properties are tabulated in Tables I and II, respectively.

TABLE I.—COMPOSITIONS OF THE INTERPOLYMERS PREPARED IN EXAMPLES 1 TO 13

| Example | Monomeric Components | Weight percent |
|---|---|---|
| 1 | VAc/EHA/HEA | 42.5/47.5/10.0 |
| 2 | VAc/EHA/HEMA | 46/52/2 |
| 3 | VAc/EHA/HPA | 45/50/5 |
| 4 | VAc/EHA/HEMA | 35/60/5 |
| 5 | VAc/EHA/HEF | 40/55/5 |
| 6 | VAc/EHA/HEMA | 40/55/5 |
| 7 | VAc/EHA/HEMA | 15/75/10 |
| 8 | VAc/EHA/HEMA | 30/60/10 |
| 9 | VAc/EHA/HEMA | 40/55/5 |
| 10 | VAc/EHA/HEMA | 42/50/8 |
| 11 | AN/EHA/HEMA | 25/70/5 |
| 12 | VCl/EHA/HEMA | 30/65/5 |
| 13 | MA/EHA/HEMA | 35/60/5 |

LEGEND.—VAc=Vinyl acetate; EHA=2-ethylhexyl acrylate; MA=Methyl acrylate; AN=Acrylonitrile; VCl=Vinyl chloride; HEA=Hydroxyethyl acrylate; HEMA=Hydroxyethyl methacrylate; HPA=Hydroxypropyl acrylate; HEF=Hydroxyethyl fumarate.

TABLE II.—SOLUTION PROPERTIES OF INTERPOLYMERS OF EXAMPLES 1 to 13

| Example | Hexane | Toluene | EAc | ETOH | T.S., percent | Visc.[2] | Rel. Visc.[3] | [η][4] |
|---|---|---|---|---|---|---|---|---|
| 1 | | 38 | 46 | 16 | 39.7 | 2,300 | | |
| 2 | 18 | | 74 | 8 | 42.0 | 5,000 | 6.0 | 1.32 |
| 3 | 18 | | 74 | 8 | 42.2 | 8,800 | 5.70 | 1.14 |
| 4 | | | 74 | 26 | 40.1 | 8,500 | | |
| 5 | | | 74 | 26 | 42.6 | 9,200 | 5.81 | 1.0 |
| 6 | | | | 100 | 52.8 | 1,960 | 1.96 | 0.35 |
| 7 | | | 61 | 39 | 40.5 | 2,400 | 4.76 | 0.75 |
| 8 | | | 74 | 26 | 39.3 | 4,700 | 6.12 | 0.97 |
| 9 | | 20 | 80 | | 40.0 | 4,000 | 5.53 | 1.17 |
| 10 | | 20 | 80 | | 40.0 | 4,000 | 4.60 | 1.04 |
| 11 | | 80 | 20 | | 37 | | | |
| 12 | | | 100 | | 41 | | | |
| 13 | | | 100 | | 45.0 | 10,900 | | |

[1] All solvent systems used contain less than 2% water by weight.
[2] Brookfield viscosity at 15° C.
[3] Relative viscosity on benzene solution containing 2 grams of resin per 100 ml. solvent at 20° C.
[4] [η] intrinsic viscosity dl/g..

LEGEND.—EAc=ethyl acetate; ETOH=ethanol.

FORMULATION OF POLYMERS WITH METAL ALKOXIDES

After the polymerization step which is described above, the polymer solutions are then formulated with at least one metal alkoxide which corresponds to the following general formula:

$$R_mM(OR')_n$$

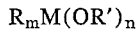

The values of the respective symbols are as hereinbefore defined.

The amount of metal alkoxide used in a given polymer system will depend upon the nature of the system and the degree of cure desired. In general, at least 0.01 equivalent of metal alkoxide per equivalent of active hydrogen in the resin should be used. Preferably, one would use 0.05 equivalent of metal alkoxide and more preferably 0.1 equivalent of metal alkoxide, per equivalent of active hydrogen in the resin. The maximum amount of metal alkoxide used will depend on the particular resin system and metal alkoxide used and the degree of crosslinking desired in the system. From a practical standpoint, no significant improvement in resin properties is found when using metal alkoxide in excess of five (5.0) equivalents per equivalent of active hydrogen in the polymer. The reference to active hydrogen in the resin in regard to the amount of metal alkovide to be used is to the hydrogen on the hydroxyl groups of the hydroxyacrylate monomer referred to as Part C above.

The manner in which the metal alkoxide is added to the polymer solution is very critical and precautions must be taken in order to prevent the gelation of the resin solution. The metal alkoxide should be dissolved in a suitable solvent prior to adding the metal alkoxide to the polymer solution. Suitable solvents for the metal alkoxide include alcohols and carboxylic acids, preferably the lower boiling alcohols such as aliphatic alcohols containing from 1 to 4 carbon atoms, e.g., methanol, ethanol, propanol, and butanol, and lower boiling aliphatic acids containing from 2 to 4 carbon atoms, e.g. acetic, propionic and butyric acids. Especially preferred are the alcoholic solvents. The solvent used to dissolve the metal alkoxide should be substantially anhydrous, i.e. contain less than 1% water by weight and more preferably less than 0.5% water by weight.

Examples of metal alkoxides for use in the practice of this invention include the following: magnesium ethoxide, calcium ethoxide, strontium ethoxide, barium ethoxide, aluminum ethoxide, aluminum isopropoxide, lanthanum t-butoxide, ferric ethoxide, ferric isopropoxide, titanium ethoxide, titanium isopropoxide, titanium butoxide, zirconium ethoxide, zirconium isopropoxide, zirconium butoxide, hafnium ethoxide, hafnium isopropoxide, cerium isopropoxide, germanium isopropoxide, stannic ethoxide, stannic isopropoxide, vanadium isopropoxide, chromium t-butoxide, niobium ethoxide, niobium isopropoxide; also included are double alkoxides such as sodium zirconium isopropoxide, potassium zirconium ethoxide, magnesium aluminum ethoxide, potassium aluminum butoxide, sodium stannic ethoxide and alkyl metal alkoxides such as diethoxy ethyl aluminum, dibutoxy diphenyl titanium, phenyl triisopropoxy titanium, dimethyl diisopropoxy titanium, dibutyl dimethoxy tin. For purposes of the present invention the use of metal halides, metal mercaptides and dialkylamino derivatives of metals of groups II, III, IV and V are regarded as equivalent to the alkoxides, since they form alkoxides when they are added to an excess of alcohol. The preferred alkoxides are those of metals which readily undergo covalency expansion. Examples of these include the alkoxides of titanium, zirconium, aluminum, iron, antimony, tin, vanadium niobium and tantalum with titanium, zirconium, aluminum, tin and antimony being preferred. Especially preferred are liquid alkoxides such as titanium isopropoxide and titanium butoxide.

The following Examples 14 and 15, are set forth to illustrate the need for dissolving the metal alkoxide in a substantially anhydrous solvent (i.e. a solvent containing less than 1% water by weight) prior to adding it to the resin solution.

Example 14

0.30 gram (0.09 equivalent per equivalent of active hydrogen) of tetrabutyltitanate are added with mild agitation to 100 grams of the solution polymer prepared in Example 9 above. Immediate gelation of the resin solution occurs.

Example 15

Example 14 is repeated here except that the tetrabutyltitanate is dissolved in five milliliters of substantially anhydrous N-propyl alcohol containing less than 1% water by weight prior to addition to the polymer solution. The metal alkoxide solution is added to the polymer solution using mild agitation. No gelation occurs and no increase in viscosity is observed over the following four-hour period, after which time the sample was used for further testing as is described below.

Example 16

This example is set forth to illustrate the necessity of using a solvent which is essentially anhydrous, that is, one that contains less than 1% of water. Two tenths (0.2) gram of tetrabutyl titanate is added to ethanol which contains 1% water. Almost immediately, a white precipitate of titanium dioxide is formed indicating the need for a substantially anhydrous solvent in which to dissolve the metal alkoxide prior to its addition to the polymer solution. When the example was repeated using ethanol which contained 0.6% water by weight, no precipitation occurred and a stable solution of metal alkoxide was obtained.

Similarly, the polymer should be prepared under conditions and with a solvent system such that the polymer solution contains less than 3% and preferably less than 2% water by weight. In illustration of this, Example 15 is repeated except that the water content of the polymer solution prepared in Example 9 is adjusted to about 5% by weight based on the total weight of solvent. When the solution of tetrabutyl titanate in substantially anhydrous N-propyl alcohol is added to the polymer solution, a white precipitate results due to the interaction of the water in the polymer solution with the tetrabutyl titanate.

TEST METHODS USED FOR EVALUATING PRESSURE-SENSITIVE, CREEP-RESISTANT POLYMERS

Peel test

Resin solution is coated on a silicone release paper to give a dry film thickness of approximately 0.8 mil. The film is dried at room temperature overnight. Polyvinyl chloride (PVC) film (UL–58, Monsanto Co.) about 3 mils thick is applied and the laminate is cut into one inch strips. The strips are aged at 70° C. and 50% R.H. for 24 hours after which time the release paper is removed. The PVC film is pressed onto steel panels (ASTM 1000–65) with a Pressure-Sensitive Tape Council roller. After 24 hours conditioning at 75° F. and 50% R.H., the polyvinyl chloride strip is peeled at 180° at a rate of 6 in. per minute.

Tack tests

The tack is measured by a loop test wherein a 4 inch strip of Mylar, ½ inch in width is clamped in the jaws of an Instron tester to form a loop 3 inches in circumference. The loop is brought into contact with a dry film of resin on a glass plate so that a bond of 0.25 sq. inch is formed. The maximum force of separation is observed at a cross-head speed of 5 inch per minute. The thickness of the film is approximately 0.8 mil.

Tack retention

Tack retention after accelerated aging is tested qualitatively by touch and quantitatively by the peel test and loop tack test. Samples of resin are coated on a silicone release paper to give a film thickness of approximately 0.8 mil. Polyvinyl chloride film is applied to the film and the resulting laminate is aged at 150° F. for one week. The release paper is removed and the coated PVC is applied in one-inch strips to aluminum panels. The peel strength determination is then carried out as described previously. Little change in peel strength with aging demonstrates good tack retention and adhesiveness.

Shrink tests

Polymer solutions are cast on release paper and dried for 2 minutes at 90° C. in the static air oven in order to remove the solvent. The dried film of polymer on release paper is applied to UL–58 vinyl sheet held in the jaws of an Instron Tensile Tester under 1% stretch. After 24 hours againg, at 72° F. in 50% relative humidity, the release paper is removed and the polymer coated vinyl is pressed onto clean glass panels. The test sample size is four inches by one-half inch (machine direction by cross direction). The glass panels are then placed in a recirculating air oven at 43.5° C. and shrinkage is determined after 3, 8 and 11 day intervals by measuring the decrease in the length of the polyvinyl chloride strip along the machine direction.

The following examples are set forth to illustrate the superior physical properties obtained with the pressure sensitive adhesives of the present invention.

Example 17

In this example, varying equivalents of tetrabutyl titanate, per equivalent of active hydrogen in the polymers, are added to the polymer solution prepared in Examples 2 to 4 and 6 to 10. In each instance, the tetrabutyl titanate (0.4 g.) is dissolved in 19 ml. of substantially anhydrous ethanol and added slowly to 100 g. of polymer solution using mild agitation. The creep resistance tests are conducted as described above. Control samples using no metal alkoxide are carried out at the same time using the same test conditions. Results of these tests are tabulated below in Table III.

TABLE III.—CREEP RESISTANCE TESTS ON POLYMER SAMPLES

| Polymer solution prepared in Example [1] | Equivalents of TBT per equivalent of active hydrogen | Creep resistance, time to failure | |
|---|---|---|---|
| | | Control samples | Using metal alkoxide |
| 2 | .30 | 16 hours | 60 days |
| 3 | .12 | 60 hours | 46 days |
| 4 | .12 | 95 hours | >1 year |
| 6 | .12 | do | 22 hours |
| 7 | .06 | do | 30 hours |
| 8 | .06 | <20 hours | 21 days |
| 9 | .12 | 3 hours | >1 year |
| 10 | .07 | 28 hours | Do. |

[1] Number refers to working examples set forth above.

The results in the foregoing Table III clearly show the superior creep resistance that is obtained using a metal alkoxide curing agent in the practice of the present invention. Note especially those results obtained using the polymer solution prepared in Examples 4, 9 and 10 above. The improvement obtained in creep resistance is even more remarkable when one considers that this improvement was obtained without resorting to the high temperature curing condition taught in the prior art.

Note the dramatic increase in creep resistance that is obtained with the polymer solution of Example 8 where only 0.06 equivalent of metal alkoxide, per equivalent of active hydrogen in the polymer, give over a 20 fold increase in creep resistance after room temperature cure.

Example 18

Example 17 is repeated here using the polymer solutions prepared in Examples 1, 5 and 11 to 13, which polymer solutions are formulated with 0.12 equivalent of tetraisopropyl titanate, per equivalent of active hydrogen in the polymer. The tetraisopropyl titanate is dissolved in substantially anhydrous methanol to provide a resin solution at 20% solids. The creep resistance tests are conducted as described above with results comparable to those obtained using the polymer solution prepared in Example 3 which had been formulated with tetrabutyl titanate as outlined in Table III above.

Example 19

In this example the polymer solution prepared in Example 10 is formulated with 0.09 equivalent tetrabutyl titanate per equivalent of active hydrogen in the polymer, according to the method described in Example 17. The system is then tested for tack, creep resistance and peel strength. The tests are conducted according to the test procedures described above after room temperature cure and again after being heated for 168 hours at 70° C. in an accelerated aging test. Included for comparison purposes are a control sample with no crosslinking agent and a sample using benzoyl peroxide as a control. The benzoyl peroxide is dissolved in ethyl acetate and then added to the polymer solution at room temperature. The results of these experiments are tabulated below in Table IV.

TABLE IV.—TEST RESULTS USING THE POLYMER PREPARED IN EXAMPLE 10

A. After Room Temperature Cure

| Crosslinking Agent | Control | Benzoyl peroxide [1] | Tetrabutyl titanate [2] |
|---|---|---|---|
| Tack (lbs./in.) | 1.6 | 1.3 | 1.4 |
| Creep resistance (hrs.) [3] | 2.8 | 3.5 | >168 |
| Peel Strength (lbs./in.) | 3.8 | 3.8 | 3.6 |

B. After 168 Hours at 70° C.

| Tack (lbs.)in.) | 1.4 | 1.2 | 1.2 |
|---|---|---|---|
| Creep resistance (hrs.) [3] | >168 | >168 | >168 |
| Peel strength (lbs./in.) | 3.7 | 3.8 | 3.8 |

[1] 1.5% by weight per 100 grams of polymer post added to polymer solution.
[2] 0.09 equivalents per equivalent of active hydrogen in polymer.
[3] Test discontinued after 168 hours.

The data in Part A of Table IV illustrates that after room temperature cure the polymer that has been reacted with tetrabutyl titanate is characterized by a degree of creep resistance that is far in excess of that obtained with the control sample or when using benzoyl peroxide. Note also that there is no appreciable decrease in tack or peel strength when using a metal alkoxide curing agent. Benzoyl peroxide which has been found to be an excellent curing agent for hydroxyl containing resins requires some heat to bring about crosslinking of the polymer. This heat is not available during short time room temperature cure. This phenomena is demonstrated in Part B of Table III which shows that upon prolonged heating the control sample and benzoyl peroxide formulated sample are equivalent to the metal alkoxide formulated sample in creep resistance after 168 hours. Note also that there is no appreciable loss in tack or peel strength in the metal alkoxide formulated sample. This illustrates the permanently tacky nature of the pressure sensitive resins of this invention.

Example 20

This example is set forth to further illustrate the advantage of using a metal alkoxide curing agent over a peroxide or methylol melamine type curing agent. Also illustrated is the effect of various concentrations of curing agent. In each instance the polymer solution of Example 9 is used. The metal alkoxide curing agent (tetrabutyl titanate) is dissolved in about 19 ml. of substantially anhydrous ethanol and then added to the polymer solution. The benzoyl peroxide and the methylol melamine curing agents are dissolved in about 19 ml. of ethyl acetate and then added to the polymer solution. The methylol melamine used is a methoxymethyl melamine containing about 3.2 moles of combined methanol per mole of hexamethylol melamine. The tests are conducted as described above. The results of this example are tabulated below in Table V.

perature cure when using a metal alkoxide (Samples B to E) in the practice of the present invention. The use of benzoyl peroxide and methylol melamine curing agents (Samples F to I) gave little or no improvement in creep resistance over the control sample under conditions of room temperature cure.

After 168 hours at 70° C. the creep resistance of the respective samples (excepting Samples A and I) is comparable due to the effect of the heat promoting the crosslinking reaction when using benzoyl peroxide and small amounts of the methoxymethyl melamine. The tack and peel strengths for the respective samples (not shown in table) after room temperature are equivalent for all samples. These tack and peel strength values also remain substantially unchanged after 168 hours at 70° C. except that Samples H and I formulated with methyoxymethyl melamine undergo substantial decrease in peel strength which is indicative of poor aging stability. The results also indicate that the high creep resistance values obtained using a metal alkoxide are not at the expense of tackiness or peel strength.

Example 21

This example is set forth to illustrate the wide variations that are possible in the choice of a metal alkoxide to be used in the practice of this invention. In each instance the polymer solutions of Example 10 is formulated with 0.18 equivalent of a metal alkoxide per equivalent of active hydrogen in the polymer. The metal alkoxide is first dissolved in a substantially anhydrous solvent prior to its addition to the polymer solution. Formulating and testing is carried out as described above.

POLYMER SOLUTION.—EXAMPLE 10

| Metal alkoxide | R | m | M | (OR') | n | Solvent for metal alkoxide |
|---|---|---|---|---|---|---|
| Zirconium ethoxide | | 0 | Zr | 0, ethyl | 4 | Ethanol. |
| Aluminum isopropoxide | | 0 | Al | 0, isopropyl | 4 | Do. |
| Stannic isopropoxide | | 0 | Sn | 0, isopropyl | 4 | Do. |
| Dibutyltin methoxide | Butyl | 2 | Sn | 0, methyl | 2 | Isopropanol. |
| Tetrabutyl titanate | | 0 | Ti | 0, butyl | 4 | Acetic acid. |

These samples were tested for creep resistance and found to be comparable to the tetrabutyl titanate formulated polymer solution described in Example 19 and Table IV.

Example 22

The following example is set forth to illustrate the improved shrink resistance obtained when polyvinyl chloride sheet and film is coated with the metal alkoxide formulated polymer solutions of the present invention. Samples of the polymer solution prepared in Example 9 are formulated with substantially anhydrous ethanolic solutions of varying concentrations of tetrabutyl titanate to provide formulated solutions at 25% solids. The shrink tests are conducted as described above. Two control samples are included in the tests: Control 1 contains no tetrabutyl titanate whereas Control 2 contains tetrabutyl titanate but this sample has been dried at room temperature for 16 hours rather than at the 2 minutes at 90° C. used to dry the other samples in order to demonstrate the room temperature cure obtained in the systems of this invention. Mild heating was used in preparing samples K through N merely to accelerate the evaporation of solvent. This heating step should not be construed as meaning that heat

TABLE V.—TEST RESULTS USING THE POLYMER SOLUTIONS OF EXAMPLE 9

| | A (Control) | B | C | D | E | F | G | H | I |
|---|---|---|---|---|---|---|---|---|---|
| Tetrabutyl titanate [1] | | 0.09 | 0.18 | 0.28 | 0.37 | | | | |
| Benzoyl peroxide [2] | | | | | | 0.5 | 2.0 | | |
| Methoxymethyl melamine [2] | | | | | | | | 0.8 | 8 |
| Creep resistance (hrs.): [3] | | | | | | | | | |
| After room temp. cure | 3 | >168 | >168 | >168 | >168 | 3 | 3 | 4 | 6 |
| After 168 hrs. at 70° C. | 20 | >168 | >168 | >168 | >168 | >168 | >168 | >168 | 34 |

[1] Equivalents per equivalent of active hydrogen in polymer.
[2] Percent by weight of polymer post added to polymer solution.
[3] Test discontinued after 168 hours.

The data in the foregoing Table V illustrates the remarkable creep resistance obtained even after room temis required to cure the polymer system and impart shrink resistance as will be explained more fully below. The results of this test are tabulated below in Table VI.

TABLE VI.—SHRINK TESTS

| Sample | Amount of TBT [1] | Shrinkage (mils) | | |
|---|---|---|---|---|
| | | 3 days | 8 days | 11 days |
| J (Control 1) | None | | 22 | 25 |
| K | .06 | | 16 | 18 |
| L | .11 | | 11 | 13 |
| M | .15 | 3 | 5 | 6 |
| N | .18 | 2 | 4 | 5 |
| O (Control 2) | .15 | 2 | 4 | 4 |

[1] Equivalents of tetrabutyl titanate per equivalent of active hydrogen in the polymer.

The data in the foregoing table will readily illustrate the improved shrink resistance that is obtained in the practice of the present invention. Note that Samples K, L, M, N, and O which contain at least 0.06 equivalent of a metal alkoxide, per equivalent of active hydrogen in the polymer have significantly less shrinkage than Sample J (Control 1) which contains no metal alkoxide. This property of shrink resistance is important in the area of laminates and surface coverings, especially in those applications where a vinyl plastic sheet such as polyvinyl chloride is laminated to a substrate as in the manufacture of luggage, wall coverings, notebooks, automobile dashboards and other related applications.

Note also that this improved shrink resistance is obtained in the practice of this invention when using room temperature curing conditions as in Sample O. This is especially useful when laminating materials which cannot tolerate the higher time-temperature curing cycles heretofore required in the art, or when laminating conditions are such that heating means are not readily available.

Example 23

Example 22 is repeated here except that 0.15 equivalent of zirconium ethoxide are used with the polymers prepared in Examples 1 to 8 and 10 to 13. In each case the samples were prepared and tested according to the procedure outlined above except that the samples were dried at room temperature for 16 hours rather than for 2 minutes at 90° C. After 8 and 11 days testing the shrink test results were found to be comparable to those obtained with Sample M in Example 22.

Example 24

Example 22 is repeated here except that 0.15 equivalent of aluminum isopropoxide are used with the polymers prepared in Examples 1 to 8 and 11 to 13. In each case the samples were prepared and tested according to the procedure outlined in Example 22 above. After 22 days there was no substantial change in the viscosity of the solutions.

Example 25

This example is set forth to illustrate the excellent shelf stability of the formulated polymer solutions of the present invention.

In each case tetrabutyl titanate is used as the metal alkoxide and except for the control the tetrabutyl titanate is dissolved in substantially anhydrous ethanol prior to addition to the polymer solution. In the control sample the polymer solution is first diluted with substantially anhydrous ethanol and the tetrabutyl titanate is added to the diluted polymer solution without first dissolving it in a solvent. The resulting gel formation further illustrates the need for first dissolving the metal alkoxide in a substantially anhydrous solvent before adding it to the polymer solution.

Brookfield viscosity measurements are taken on the formulated polymer solutions at 25° C. Results of the viscosity measurements are tabulated below in Table VII.

TABLE VII.—SHELF STABILITY OF FORMULATED POLYMER SOLUTIONS

| Polymer solution [1] | Amount of tetrabutyl titanate [2] | Days | | | | | | |
|---|---|---|---|---|---|---|---|---|
| | | 0 | 1 | 3 | 4 | 7 | 17 | 22 | 120 |
| Example: | | | | | | | | | |
| 10 | 0.11 | 470 | 690 | | 732 | 721 | 640 | 640 | |
| 10 | 0.04 | 285 | 290 | 301 | | 316 | 286 | 284 | |
| 9 | 0.06 | 510 | 520 | 525 | | 525 | 505 | 510 | 510 |
| 9 | 0.37 | 880 | | | | | | | 550 |
| Control | 0.11 | Gel structure | | | | | | | |

[1] Prepared in those examples indicated.
[2] Equivalents, per equivalent of active hydrogen in the polymer.

The viscosity data in foregoing Table VII illustrates the solution viscosity stability that is obtained with the metal alkoxide formulated polymer solutions of the present invention. The relatively constant viscosity readings indicate that a stable solution is prepared with unexpectedly good shelf life.

Example 26

This example is set forth to illustrate that the metal alkoxide formulated polymer solutions of the present invention retain their tackiness even after accelerated aging. In each instance the polymer solutions prepared in Example 1 to 13 were formulated with 0.1 equivalent of tetrabutyl titanate, per equivalent of active hydrogen in the polymer solution.

These solutions were cast on a Teflon® sheet and held at 70° C. for 160 hours after which time they were tested qualitatively by touch and found to be tacky, indicating that tackiness is retained upon aging.

The compositions of the present invention may be used as the adhesive component in pressure sensitive tapes, films and foams. They adhere well to resin surfaces such as plasticized poly(vinyl chloride) Mylar, cellulose acetate, nylon, polyethylene and polypropylene, as well as to paper, metal and painted surfaces. They are especially useful as the adhesive component of decorative vinyl sheets and decals, conferring excellent shrink resistance to vinyl film. Their excellent tack retention, creep resistance and resistance to plasticizer migration make them useful as adhesives for vinyl foam. Their outstanding tack, wetting and holding power may be used to advantage in transfer adhesive applications.

One of the outstanding features of the metal alkoxide formulated polymer solutions of the present invention is that they can be cured at room temperature. However, this should not be construed as limiting the use of these novel compositions to conditions of room temperature cure. Those skilled in the art will realize that the compositions of the present invention may also be used under the usual time/temperature conditions heretofore required for curing the permanently tacky pressure sensitive resins of the prior art. Furthermore, mild time/temperature cycles may be used to advantage to accelerate the removal of the solvent from cast polymer films. This drying operation should not be construed as meaning that heating is necessary to crosslink or cure the metal alkoxide formulated polymer solutions of the present invention.

While the present invention has been described with particular reference to certain specific embodiments thereof, it will be understood that certain changes, substitutions and modifications may be made therein without departing from the scope thereof. This invention also contemplates the use of fillers, extenders, stabilizers, tackifiers, dyes, etc., in the polymeric compositions of this invention.

What is claimed is:
1. An organic solvent solution comprising a metal alkoxide and an interpolymer prepared from a mixture of monomers comprising from 20 to 80 weight percent of

(A), from 10 to 55 weight percent of (B) and from 1 to 20 weight percent of (C), wherein (A), (B) and (C) total weight percent of any given mixture of monomers; wherein (A) is selected from the group consisting of esters of acrylic acid and methacrylic acid containing from 7 to 20 carbon atoms; (B) is a monomer selected from the group consisting of vinyl esters of alkanoic acids containing from 3 to 10 carbon atoms, ethyl and methyl esters of acrylic and methacrylic acids, acrylonitrile, styrene and vinyl chloride; (C) is a hydroxy-containing monomer selected from the group consisting of hydroxyalkyl acrylates, hydroxyalkyl methacrylates, hydroxyalkyl fumarates and hydroxyalkyl maleates, wherein the alkyl group contains from 2 to 4 carbon atoms; and wherein the metal alkoxide is of the following general formula:

$$R_mM(OR')_n$$

wherein M is a metal selected from the group consisting of Groups II, III, IV and V of the Periodic Table; R is selected from the group consisting of alkyl radicals of from 1 to 8 carbon atoms and aryl radicals of from 6 to 16 carbon atoms; R' is selected from the group consisting of aliphatic and substituted aliphatic radicals containing from 1 to 18 carbon atoms; m is an integer whose value is zero or greater and n is an integer of at least 2, wherein the sum of m+n is greater than one (1) and is equal to the valence of the metal represented by M; and wherein the metal alkoxide is present in an amount of at least 0.01 equivalent per equivalent of active hydrogen in the polymer, wherein the organic solvent solution contains less than 3% by weight of water based on the total weight of the solvent.

2. The organic solvent solution of claim 1 wherein (B) is a vinyl ester.

3. The organic solvent solution of claim 1 wherein (C) is a hydroxyalkyl acrylate.

4. The organic solvent solution of claim 1 wherein (C) is a hydroxyalkyl methacrylate.

5. The organic solvent solution of claim 1 wherein (C) is a bis(hydroxy-alkyl)fumarate.

6. The organic solvent solution of claim 1 wherein the metal alkoxide is selected from the group consisting of tetrabutyl titanate, titanium isopropoxide, titanium butoxide, aluminum isopropoxide, zirconium ethoxide, stannic isopropoxide and dibutyltin methoxide.

7. A film of a room temperature crosslinkable, pressure-sensitive, creep-resistant permanently tacky polymer comprising a metal alkoxide and an interpolymer prepared from a mixture of monomers comprising from 20 to 80 weight percent of (A), from 10 to 55 weight percent of (B), and from 1 to 20 weight percent of (C), wherein (A), (B) and (C) total 100 weight percent of any given mixture of monomers; wherein (A) is selected from the group consisting of esters of acrylic acid and methacrylic acid containing from 7 to 20 carbon atoms; (B) is a monomer selected from the group consisting of vinyl esters of alkanoic acids containing from 3 to 10 carbon atoms, ethyl and methyl esters of acrylic and methacrylic acids, acrylonitrile, styrene and vinyl chloride; (C) is a hydroxy-containing monomer selected from the group consisting of hydroxyalkyl acrylates, hydroxyalkyl methacrylates, hydroxyalkyl fumarates and hydroxyalkyl maleates, wherein the alkyl group contains from 2 to 4 carbon atoms; and wherein the metal alkoxide is of the following general formula:

$$R_mM(OR')_n$$

wherein M is a metal selected from the group consisting of Groups II, III, IV and V of the Periodic Table; R is selected from the group consisting of alkyl radicals of from 1 to 8 carbon atoms and aryl radicals of from 6 to 16 carbon atoms; R' is selected from the group consisting of aliphatic and substituted aliphatic radicals containing from 1 to 18 carbon atoms; m is an integer whose value is zero or greater and n is an integer of at least 2, wherein the sum of m+n is greater than one (1) and is equal to the valence of the metal represented by M; and wherein the metal alkoxide is present in an amount of at least 0.001 equivalent per equivalent of active hydrogen in the polymer.

8. A film as in claim 7 wherein (B) is a vinyl ester.

9. A film as in claim 7 wherein (C) is hydroxyalkyl methacrylate.

10. A film as in claim 7 wherein (C) is a bis-(hydroxyalkyl) fumarate.

11. A film as in claim 7 wherein the metal alkoxide is selected from the group consisting of tetrabutyl titanate, titanium isopropoxide, titanium butoxide, aluminum isopropoxide, zirconium ethoxide, stannic isopropoxide and dibutyltin methoxide.

12. A crosslinked, pressure-sensitive, creep-resistant permanently tacky interpolymer which is the reaction product of a metal alkoxide and an interpolymer prepared from a mixture of monomers comprising from 20 to 80 weight percent of (A), from 10 to 55 weight percent of (B) and from 1 to 20 weight percent of (C), wherein (A), (B) and (C) total 100 weight percent of any given mixture of monomers; wherein (A) is selected from the group consisting of esters of acrylic acid and methacrylic acid containing from 7 to 20 carbon atoms; (B) is a monomer selected from the group consisting of vinyl esters of alkanoic acids containing from 3 to 10 carbon atoms, ethyl and methyl esters of acrylic and methacrylic acids, acrylonitrile, styrene and vinyl chloride; (C) is a hydroxy-containing monomer selected from the group consisting of hydroxyalkyl acrylates, hydroxyalkyl methacrylates, hydroxyalkyl fumarates and hydroxyalkyl maleates, wherein the alkyl group contains from 2 to 4 carbon atoms; and wherein the metal alkoxide is of the following general formula:

$$R_mM(OR')_n$$

wherein M is a metal selected from the group consisting of Groups II, III, IV and V of the Periodic Table; R is selected from the group consisting of alkyl radicals of from 1 to 8 carbon atoms and aryl radicals of from 6 to 16 carbon atoms; R' is selected from the group consisting of aliphatic and substituted aliphatic radicals containing from 1 to 18 carbon atoms; m is an integer whose value is zero or greater and n is an integer of at least 2, wherein the sum of m+n is greater than one (1) and is equal to the valence of the metal represented by M; and wherein the metal alkoxide is present in an amount of at least 0.01 equivalent per equivalent of active hydrogen in the polymer.

13. A process for the preparation of an organic liquid system polymer which comprises:

(I) polymerizing in an organic solvent system a mixture of monomers comprising from 20–80 weight percent of (A), from 10–55 weight percent of (B) and from 1–20 weight percent of (C), wherein (A), (B) and (C) total 100 weight percent of any given mixture of monomers; wherein (A) is selected from the group consisting of esters of acrylic acid and methacrylic acid containing from 7–20 carbon atoms; (B) is a monomer selected from the group consisting of vinyl esters of alkanoic acids containing from 3–10 carbon atoms, ethyl and methyl esters of acrylic and methacrylic acids, acrylonitrile, styrene and vinyl chloride; (C) is a hydroxy-containing monomer selected from the group consisting of hydroxalkyl acrylates, hydroxyalkyl methacrylates, hydroxyalkyl fumarates and hydroxyalkyl maleates, wherein the alkyl group contains from 2 to 4 carbon atoms; using heat and a polymerization initiator; wherein the final polymer solution contains less than 3% water by weight based on the weight of the solvent;

(II) dissolving at least 0.01 equivalent of a metal alkoxide per equivalent of active hydrogen in the polymer in a substantially anhydrous solvent;

(III) adding the metal alkoxide solution to the polymer solution.

14. The process of claim 13, wherein the substantially anhydrous solvent for the metal alkoxide is selected from the group consisting of aliphatic alcohols of from 1 to 4 carbon atoms and lower aliphatic acids of from 2 to 4 carbon atoms.

15. An article of manufacture which comprises a backing member coated with the polymeric composition of claim 1.

16. The article of manufacture of claim 15 wherein the backing member is a tape.

17. The article of manufacture of claim 15 wherein the backing member is a synthetic resin sheet.

References Cited

UNITED STATES PATENTS

| 3,117,099 | 1/1964 | Proops et al. | 260—18 |
| 3,208,963 | 9/1965 | Jasinski | 260—29.6 |
| 3,264,272 | 8/1966 | Rees | 260—78.5 |
| 3,269,994 | 8/1966 | Horne et al. | 260—86.1 |
| 3,326,859 | 6/1967 | Seiner | 260—72 |

JOSEPH L. SCHOFER, Primary Examiner

J. KIGHT, Assistant Examiner

U.S. Cl. X.R.

260—29.1, 33.4, 33.6, 78.5, 80.75, 80.81

PO-1050
(5/69)

UNITED STATES PATENT OFFICE
CERTIFICATE OF CORRECTION

Patent No. 3,532,708      Dated October 6, 1970

Inventor(s) Robert B. Blance

It is certified that error appears in the above-identified patent and that said Letters Patent are hereby corrected as shown below:

Column 8, Table III, under "Control Samples" in Example 6, reads "95" and should read - - - 2 - - -.

Column 9, Table V, last line under "I" reads "34" and should read - - - 24 - - -.

Column 13, Claim 1, line 3, after "total" insert - - - 100 - - -.

SIGNED AND SEALED
MAR 2 1971

(SEAL)
Attest:

Edward M. Fletcher, Jr.
Attesting Officer

WILLIAM E. SCHUYLER, JR.
Commissioner of Patents